(12) United States Patent
Schlosser

(10) Patent No.: US 10,209,112 B2
(45) Date of Patent: Feb. 19, 2019

(54) APPARATUS AND METHOD FOR DETECTING ASYMMETRIC FLOW IN VIBRATING FLOWMETERS

(71) Applicant: Micro Motion, Inc., Boulder, CO (US)

(72) Inventor: Martin Andrew Schlosser, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 95 days.

(21) Appl. No.: 15/126,637

(22) PCT Filed: Apr. 7, 2014

(86) PCT No.: PCT/US2014/033211
§ 371 (c)(1),
(2) Date: Sep. 16, 2016

(87) PCT Pub. No.: WO2015/156767
PCT Pub. Date: Oct. 15, 2015

(65) Prior Publication Data
US 2017/0082474 A1    Mar. 23, 2017

(51) Int. Cl.
*G01F 1/84* (2006.01)
(52) U.S. Cl.
CPC .......... *G01F 1/8436* (2013.01); *G01F 1/8427* (2013.01); *G01F 1/8431* (2013.01); *G01F 1/8477* (2013.01)
(58) Field of Classification Search
CPC ....................................................... G01F 1/84
See application file for complete search history.

(56) References Cited

U.S. PATENT DOCUMENTS

| 3,340,733 | A | | 9/1967 | Lasher | |
|---|---|---|---|---|---|
| 4,381,680 | A | | 5/1983 | Shiota | |
| RE31,450 | E | * | 11/1983 | Smith | G01F 1/8413 73/32 A |
| 4,691,578 | A | | 9/1987 | Herzl | |
| 4,852,410 | A | * | 8/1989 | Corwon | G01F 1/8413 73/861.355 |
| 4,856,346 | A | * | 8/1989 | Kane | G01F 1/8413 73/861.355 |
| 5,027,662 | A | | 7/1991 | Titlow et al. | |
| 5,370,002 | A | | 12/1994 | Normen et al. | |
| 6,227,059 | B1 | * | 5/2001 | Schott | G01F 1/8427 73/861.356 |

(Continued)

FOREIGN PATENT DOCUMENTS

| EP | 2019295 A1 | 1/2009 |
|---|---|---|
| WO | 0136918 A2 | 5/2001 |

(Continued)

*Primary Examiner* — Jewel V Dowtin
(74) *Attorney, Agent, or Firm* — The Ollila Law Group LLC

(57) ABSTRACT

A flowmeter is provided that includes a sensor assembly and meter electronics. The flowmeter comprises two or more flow tubes, a driver coupled to the flow tubes that is oriented to induce a drive mode vibration in the flow tubes. Two or more strain gages are coupled to the two flow tubes and oriented to detect the phase of the drive mode vibration. One or more bridge circuits is in electrical communication with the two or more strain gages, wherein the bridge circuits are configured to output a signal indicating an asymmetric flow between the two flow tubes.

27 Claims, 5 Drawing Sheets

(56) References Cited

U.S. PATENT DOCUMENTS 6,684,715 B1 * 2/2004 Cage ................ G01F 1/8427
                                                             73/861.357
2013/0228003 A1    9/2013 Bierweiler et al.
2017/0082474 A1 * 3/2017 Schlosser .......... G01F 1/8427

FOREIGN PATENT DOCUMENTS

| WO | 03056282 A1 | 7/2003 |
|---|---|---|
| WO | 2012016581 A1 | 2/2012 |

* cited by examiner

APPARATUS AND METHOD FOR DETECTING ASYMMETRIC FLOW IN VIBRATING FLOWMETERS

FIELD OF THE INVENTION

The embodiments described below relate to vibrating meters, and more particularly, to methods and apparatuses for the detection of asymmetric flow in multi-flow tube vibrating meters.

BACKGROUND

Vibrating conduit sensors, such as Coriolis mass flowmeters and vibrating densitometers, typically operate by detecting motion of a vibrating conduit that contains a flowing material. Properties associated with the material in the conduit, such as mass flow, density, and the like, can be determined by processing measurement signals received from motion transducers associated with the conduit. The vibration modes of the vibrating material-filled system generally are affected by the combined mass, stiffness, and damping characteristics of the conduit and the material contained therein.

It is well known to use vibrating meters to measure mass flow and other properties of materials flowing through a pipeline. For example, vibrating Coriolis flowmeters are disclosed in U.S. Pat. No. 4,491,025 issued to J. E. Smith, et al. of Jan. 1, 1985 and also Re. 31,450 to J. E. Smith of Nov. 29, 1983. These vibrating meters have one or more fluid tubes. Each fluid tube configuration in a Coriolis mass flowmeter has a set of natural vibration modes, which may be of a simple bending, torsional, radial, lateral, or coupled type. Each fluid tube is driven to oscillate at resonance in one of these natural modes. The vibration modes are generally affected by the combined mass, stiffness, and damping characteristics of the containing fluid tube and the material contained therein, thus mass, stiffness, and damping are typically determined during an initial calibration of the vibrating meter using well-known techniques.

Material flows into the flowmeter from a connected pipeline on the inlet side of the vibrating meter. The material is then directed through the fluid tube or fluid tubes and exits the flowmeter to a pipeline connected on the outlet side.

A driver, such as a voice-coil style driver, applies a force to the one or more fluid tubes. The force causes the one or more fluid tubes to oscillate. When there is no material flowing through the flowmeter, all points along a fluid tube oscillate with an identical phase. As a material begins to flow through the fluid tubes, Coriolis accelerations cause each point along the fluid tubes to have a different phase with respect to other points along the fluid tubes. The phase on the inlet side of the fluid tube lags the driver, while the phase on the outlet side leads the driver. Sensors are placed at two different points on the fluid tube to produce sinusoidal signals representative of the motion of the fluid tube at the two points. A phase difference of the two signals received from the sensors is calculated in units of time.

The phase difference between the two sensor signals is proportional to the mass flow rate of the material flowing through the fluid tube or fluid tubes. The mass flow rate of the material is determined by multiplying the phase difference by a flow calibration factor. The flow calibration factor is dependent upon material properties and cross sectional properties of the fluid tube. One of the major characteristics of the fluid tube that affects the flow calibration factor is the fluid tube's stiffness. Prior to installation of the flowmeter into a pipeline, the flow calibration factor is determined by a calibration process. During the calibration process, a known fluid is passed through the fluid tube at a given flow rate and the proportion between the phase difference and the flow rate is calculated. The fluid tube's stiffness and damping characteristics are also determined during the calibration process as is generally known in the art.

One advantage of a Coriolis flowmeter is that the accuracy of the measured mass flow rate is not affected by wear of moving components in the flowmeter, as there are no moving components in the vibrating fluid tube. The flow rate is determined by multiplying the phase difference between two points on the fluid tube and the flow calibration factor. The only input is the sinusoidal signals from the sensors indicating the oscillation of two points on the fluid tube. The phase difference is calculated from the sinusoidal signals. Since the flow calibration factor is proportional to the material and cross sectional properties of the fluid tube, the phase difference measurement and the flow calibration factor are not affected by wear of moving components in the flowmeter.

A typical Coriolis mass flowmeter includes one or more transducers (or pickoff sensors), which are typically employed in order to measure a vibrational response of the flow conduit or conduits, and are typically located at positions upstream and downstream of the driver. The pickoff sensors are connected to electronic instrumentation. The instrumentation receives signals from the two pickoffs and processes the signals in order to derive a mass flow rate measurement, among other things.

Typical Coriolis flowmeters measure flow and/or density through the use of a coil and magnet as a pickoff sensor to measure the motion of a meter's vibrating flow tube/tubes. The mass flow rate through the meter is determined from the phase difference between multiple pickoff signals located near the inlet and outlet of the meter's flow tubes. However, it is possible to measure flow using strain gages in place of coil/magnet pickoffs. For example, International Patent Application No. PCT/US2014/033188 entitled "Improved vibrating flowmeter and related methods" describes a number of embodiments wherein a vibratory flowmeter utilizes strain gages instead of coil/magnet pickoffs to calculate mass flow, and this application is herein incorporated by reference, in its entirety. A fundamental difference between the two sensor types is that coil/magnet pickoffs measure the velocity of the flow tubes and strain gages measure the strain of the flow tubes. One benefit to utilizing coil/magnet pickoffs is that no matter how flow is split between two flow tubes, the meter flow control factor (FCF) does not change. Therefore clogs or residue build-up in one of the flow tubes does not interfere with mass flow measurements. It is precisely this "benefit" of coil/magnet pickoffs that limits their use for detecting clogs or residue build-up in the flow tubes.

A problem, therefore, with prior art flowmeters is their inherent lack of obstruction or build-up detection. The embodiments described below overcome this and other problems and an advance in the art is achieved. The embodiments described below provide a flowmeter with strain gages configured to detect asymmetric flow between the flow tubes of a flowmeter for the purpose of detecting obstructions or residue accumulation in the flow tubes. By connecting various combinations of strain gages having varying placements and orientations on a flowmeter with various combinations of Wheatstone bridge circuits, flow asymmetry is rendered detectable and reportable.

SUMMARY OF THE INVENTION

A vibrating meter including a sensor assembly and a meter electronics is provided according to an embodiment. The vibrating meter comprises two or more flow tubes and a driver coupled to the two flow tubes. The driver is configured to induce a drive mode vibration in the two flow tubes. The vibrating meter also comprises two or more strain gages coupled to the two flow tubes and configured to detect a phase of the drive mode vibration. One or more bridge circuits are in electrical communication with the two or more strain gages, and are configured to output a signal indicating an asymmetric flow between the two or more flow tubes.

A vibrating meter including a sensor assembly and a meter electronics is provided according to an embodiment. The vibrating meter comprises two or more flow tubes and a sensor coupled to at least one of the two or more flow tubes, wherein the sensor is configured to output a signal to indicate the presence of an asymmetric flow between the two flow tubes.

A method for determining flow asymmetry through two flow tubes in a flowmeter is provided according to an embodiment. The method comprises the steps of: vibrating the two flow tubes in a drive mode vibration; measuring a vibrational response of a first flow tube of the two flow tubes; measuring a vibrational response of a second flow tube of the two flow tubes; comparing the vibrational responses of the first and second flow tubes; and determining the presence of a flow asymmetry between the first and second flow tubes.

A method for determining flow asymmetry through two flow tubes in a flowmeter is provided according to an embodiment. The method comprises the steps of: vibrating the two flow tubes in a drive mode vibration; measuring a vibrational response of a first flow tube of the two flow tubes; measuring a vibrational response of a second flow tube of the two flow tubes; comparing the vibrational responses of the first and second flow tubes; and determining the presence of a flow asymmetry between the first and second flow tubes.

Aspects

According to an aspect, a vibrating meter including a sensor assembly and a meter electronics comprises: two or more flow tubes; a driver coupled to the two flow tubes and configured to induce a drive mode vibration in the two flow tubes; two or more strain gages coupled to the two flow tubes and configured to detect a phase of the drive mode vibration; and one or more bridge circuits in electrical communication with the two or more strain gages, configured to output a signal indicating an asymmetric flow between the two or more flow tubes.

Preferably, the signal is proportional to a strain difference between the two or more strain gages.

Preferably, the signal comprises an electrical subtraction of a signal from a first of the two or more strain gages from a signal from a second of the two or more strain gages.

Preferably, the signal further comprises a sinusoidal output at a drive mode frequency having an amplitude that is proportional to a difference that comprises the subtraction of a phase-shifted signal of the first of the two or more strain gages from a phase-shifted signal of the second of the two or more strain gages.

Preferably, the vibrating meter further comprises a magnet/coil pickoff sensor coupled to the two or more flow tubes.

Preferably, the vibrating meter further comprises an indicator configured to indicate an asymmetric flow between the two or more flow tubes.

Preferably, the indicator comprises at least one of a visual and an audible alarm.

Preferably, a strain gage of the two or more strain gages is coupled to one of the two or more flow tubes and is configured to detect a strain of the one of the two or more flow tubes that is approximately parallel with the longitudinal axis of the one of the two or more flow tubes.

Preferably, a strain gage of the two or more strain gages is placed proximate a brace bar so that the strain gage of the two or more strain gages is subjected to approximately a maximum strain amplitude of the two or more flow tubes induced by the drive mode vibration.

Preferably, a first strain gage of the two or more strain gages is coupled to a distal surface of an inlet leg of a first flow tube of the two or more flow tubes; the first strain gage of the two or more strain gages is in electrical communication with a first position of a first bridge circuit of the one or more bridge circuits; a second strain gage of the two or more strain gages is coupled to a distal surface of an inlet leg of the first flow tube of the two or more flow tubes; and the second strain gage of the two or more strain gages is in electrical communication with a second position of the first bridge circuit of the one or more bridge circuits.

Preferably, a first strain gage of the two or more strain gages is coupled to a proximal surface of an inlet leg of a first flow tube of the two or more flow tubes; the first strain gage of the two or more strain gages is in electrical communication with a first position of a first bridge circuit of the one or more bridge circuits; a second strain gage of the two or more strain gages is coupled to a proximal surface of an inlet leg of the first flow tube of the two or more flow tubes; and the second strain gage of the two or more strain gages is in electrical communication with a second position of the first bridge circuit of the one or more bridge circuits.

According to an aspect, a vibrating meter including a sensor assembly and a meter electronics comprises: two or more flow tubes; and a sensor coupled to at least one of the two or more flow tubes, wherein the sensor is configured to output a signal to indicate the presence of an asymmetric flow between the two flow tubes.

Preferably, the sensor is a strain gage.

Preferably, the vibrating meter further comprises an electrical circuit in communication with the sensor.

Preferably, the electrical circuit comprises a bridge circuit.

Preferably, the signal comprises an imbalance in the bridge circuit.

Preferably, the signal comprises a changed amplitude of an output of the bridge circuit.

Preferably, the signal comprises an electrical subtraction comprising a phase-shifted signal of the sensor.

Preferably, the signal further comprises a sinusoidal output at a drive mode frequency having an amplitude that is proportional to a difference that comprises an electrical subtraction comprising a phase-shifted signal of the sensor.

According to an aspect, a method for determining flow asymmetry through two flow tubes in a flowmeter comprises the steps of: vibrating the two flow tubes in a drive mode vibration; measuring a vibrational response of a first flow tube of the two flow tubes; measuring a vibrational response of a second flow tube of the two flow tubes; comparing the vibrational responses of the first and second flow tubes; and determining the presence of a flow asymmetry between the first and second flow tubes.

Preferably, the method further comprises the step of: indicating a presence of a flow asymmetry if the difference in the vibrational responses between the first flow tube and the second flow tube is greater than a predetermined threshold.

Preferably, the step of indicating the presence of the flow asymmetry if the difference in the vibrational responses between the first flow tube and the second flow tube is greater than a predetermined threshold comprises the step of triggering an alarm.

Preferably, the step of measuring a vibrational response of a first flow tube of the two flow tubes further comprises the step of measuring the vibrational response of the first flow tube of the two flow tubes with a first strain gage; and the step of measuring the vibrational response of the second flow tube of the two flow tubes further comprises the step of measuring the vibrational response of the second flow tube of the two flow tubes with a second strain gage.

Preferably, the step of measuring the vibrational response of the first flow tube of the two flow tubes with a first strain gage further comprises measuring an output of a bridge circuit in electrical communication with the first strain gage; and the step of measuring the vibrational response of the second flow tube of the two flow tubes with a second strain gage further comprises measuring an output of a bridge circuit in electrical communication with the second strain gage.

Preferably, the method for determining flow through two flow tubes in the flowmeter, further comprises the steps of: coupling the first strain gage to a distal surface of a leg of the first flow tube, wherein the first strain gage is in electrical communication with a first position of a bridge circuit; and coupling the second strain gage to a distal surface of a leg of the second flow tube, wherein the second strain gage is in electrical communication with a second position of the bridge circuit.

Preferably, the step of comparing the vibrational responses of the first and second flow tubes further comprises the step of:

generating an output signal from at least one bridge circuit.

Preferably, the vibrational response of the first flow tube comprises a strain of the first flow tube; and the vibrational response of the second flow tube comprises a strain of the second flow tube.

Preferably, the first strain gage is coupled to the first flow tube proximate a brace bar; and the second strain gage is coupled to the second flow tube proximate a brace bar.

According to an aspect, a method for determining flow asymmetry through two flow tubes in a flowmeter, comprising the steps of: vibrating the two flow tubes; determining an absolute phase of a first flow tube of the two flow tubes; determining an absolute phase of a second flow tube of the two flow tubes; and determining a difference in absolute phase between the first flow tube and the second flow tube.

Preferably, the method further comprises the steps of: measuring a first strain of the first flow tube; and measuring a second strain of the second flow tube.

Preferably, the method further comprises the step of: indicating a presence of a flow asymmetry if the difference in absolute phase between the first flow tube and the second flow tube is greater than a predetermined threshold.

BRIEF DESCRIPTION OF THE DRAWINGS

The same reference number represents the same element on all drawings. The drawings are not necessarily to scale.

DETAILED DESCRIPTION OF THE INVENTION

FIGS. 1-5 and the following description depict specific examples to teach those skilled in the art how to make and use the best mode of embodiments of a flowmeter and related methods. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
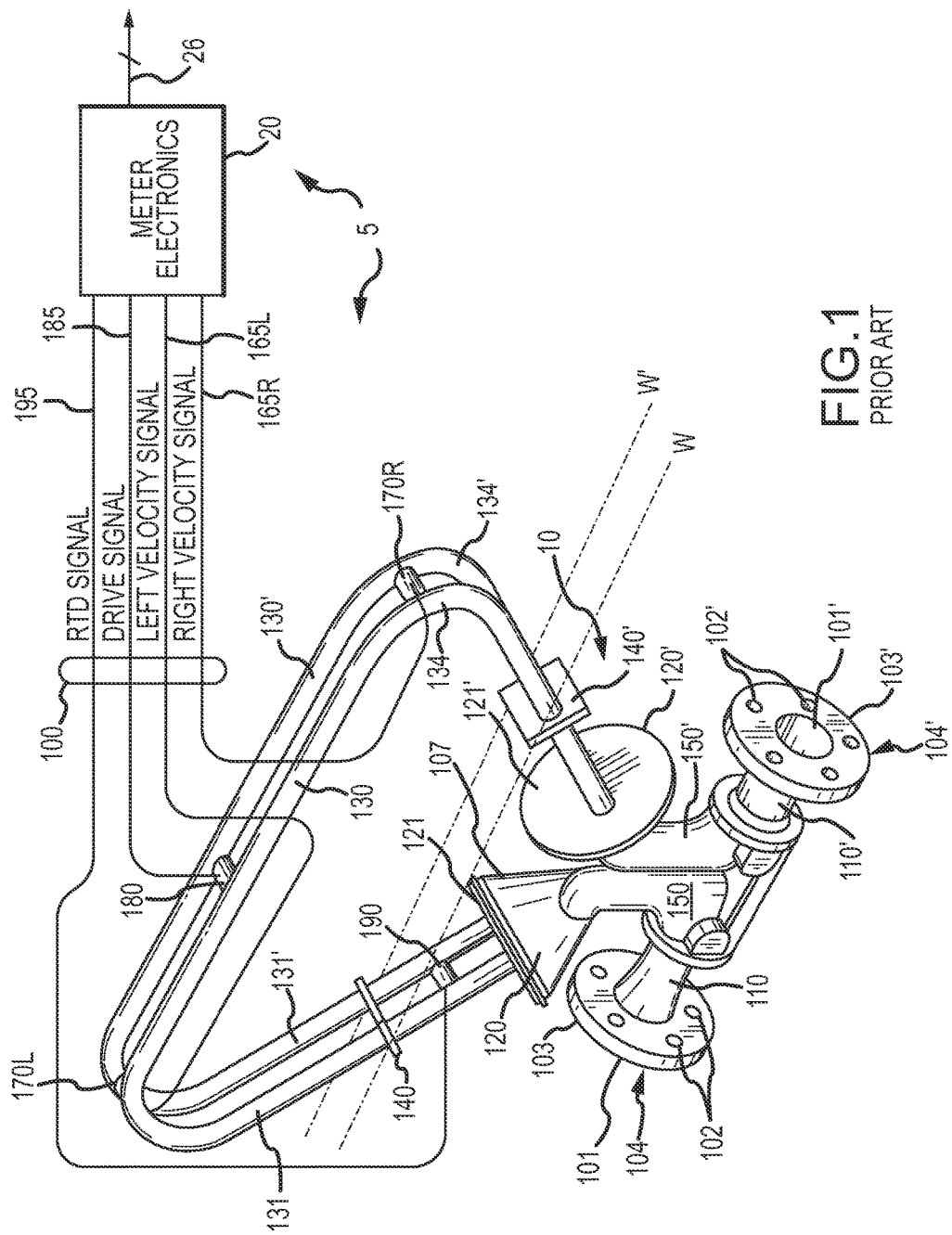
FIG. 1 illustrates a prior art flowmeter.

FIG. 1 illustrates a prior art flowmeter 5, such as a vibratory flowmeter or Coriolis flowmeter. The flowmeter 5 comprises a sensor assembly 10 and meter electronics 20. The meter assembly 10 responds to mass flow rate and density of a process material. Meter electronics 20 are connected to meter assembly 10 via leads 100 to provide density, mass flow rate, and temperature information over path 26, as well as other information not relevant to the present invention. Meter assembly 10 includes a pair of manifolds 150 and 150', flanges 103 and 103' having flange necks 110 and 110', a pair of parallel flow tubes 130 (first flow tube) and 130' (second flow tube), driver 180, temperature sensor 190, and a pair of pickoffs 170L and 170R, such as magnet/coil velocity sensors, strain gages, optical sensors, or any other pickoff known in the art. The flow tubes 130 and 130' each have inlet legs 131 and 131' and outlet legs 134 and 134', which converge towards flow tube mounting blocks 120 and 120'. Flow tubes 130 and 130' bend at least one symmetrical location along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through the sensor assembly 10.

Flanges 103 and 103', having holes 102 and 102', are connected via inlet end 104 and outlet end 104' into a process line (not shown), which carries the process material that is being measured. Material enters the inlet end 104 through an orifice 101 that passes through the manifold 150 to flow tube mounting block 120. Within manifold 150, the material is divided and routed through flow tubes 130 and 130'. Upon exiting flow tubes 130 and 130', the process material is recombined in a single stream within manifold 150' and is thereafter routed to outlet end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia, and Young's modulus about bending axes W-W and W'-W', respectively. These bending axes go through brace bars 140 and 140'. Inasmuch as the Young's modulus of the flow tubes change with temperature, and this change affects the calculation of flow and density, a temperature sensor 190 such as a resistive temperature detector (RTD) is mounted to flow tube 130', to continuously measure the temperature of the flow tube. The temperature of the flow tube and hence the voltage appearing across the RTD for a given current passing therethrough is governed by the temperature of the material passing through the flow tube. The temperature-dependent voltage appearing across the RTD is used in a well-known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' at what is termed the first out-of-phase bending mode of the flowmeter. This driver 180 may comprise any one of many well-known arrangements, such as a magnet mounted to flow tube 130' and an opposing coil mounted to flow tube 130, through which an alternating current is passed for vibrating both flow tubes. A suitable drive signal is applied by meter electronics 20, via lead 185, to the driver 180.

Meter electronics 20 receive the RTD temperature signal on lead 195, and the left and right velocity signals appearing on leads 165L and 165R, respectively. Meter electronics 20 produce the drive signal appearing on lead 185 to driver 180 and vibrate tubes 130 and 130'. Meter electronics 20 process the left and right velocity signals and the RTD signal to compute the mass flow rate and the density of the material passing through meter assembly 10. This information, along with other information, is applied by meter electronics 20 over path 26 to utilization means.

Typically, Coriolis meters are driven at the first out-of-phase bend mode, with the flow-induced phase between inlet and outlet legs being sensed using coil/magnet pickoffs mounted on the inlet and outlet legs of the flowmeter. The meter itself and the methods for calculating flow described herein differ from traditional methods by which phase between two separate signals is calculated in the transmitter. In an embodiment, fluid flow is indicated by the changing amplitude of the output of a bridge circuit connected to at least one strain gage—which is normally zero under a no flow condition (i.e. the drive mode is a normal mode with equal strain on the inlet and outlet legs). However, when flow is introduced, the drive mode becomes complex and there is phase delay between the motion of the inlet and outlet of the tube. This difference detected by strain gages is exploited using bridge circuits, including Wheatstone bridge circuits, as described herein.

Figure 2:
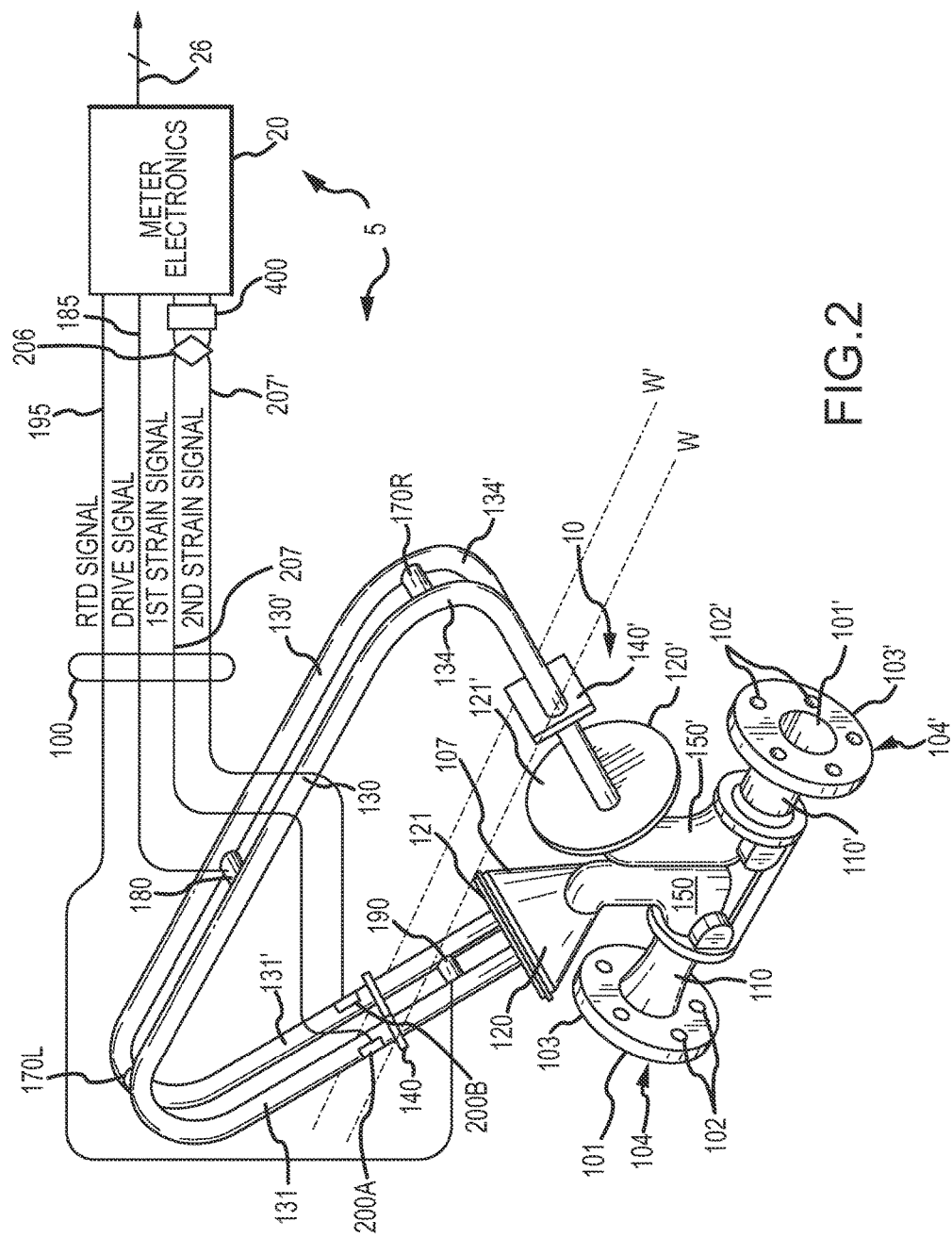
FIG. 2 illustrates an embodiment of a flowmeter.

FIG. 2 illustrates an embodiment of a flowmeter 5. A Coriolis flowmeter structure is described although it is apparent to those skilled in the art that the present invention could be practiced as a vibrating tube densitometer without the additional measurement capability provided by a Coriolis mass flowmeter. Common elements with the prior art device of FIG. 1 share the same reference numbers. The flow tubes 130 and 130' are driven by driver 180 in opposite directions about their respective bending axes W and W' and at what is termed the first out-of-phase bending mode of the flowmeter. This driver 180 may comprise any one of many well-known arrangements, such as a magnet mounted to flow tube 130' and an opposing coil mounted to flow tube 130 and through which an alternating current is passed for vibrating both flow tubes 130, 130'. A suitable drive signal is applied by meter electronics 20, via lead 185, to the driver 180. A first strain gage 200A is located on inlet leg 131 of the first flow tube 130 and a second strain gage 200B is located on the inlet leg 131' of the second flow tube 130'. The primary difference between the two pickoffs 170L, 170R (FIG. 1) and the strain gages 200A, 200B is that coil/magnet pickoffs measure the velocity of the flow tubes and strain gages measure the strain of the flow tubes. What is of particular importance is the distinction that the strain gages 200A, 200B measure absolute changes in motion, while coil/magnet pickoffs measure relative motion, so flow asymmetry is detectable by the strain gages, but the pickoffs 170L, 170R due to their relative nature, do not detect such asymmetry. It is preferable that each strain gage disclosed herein 200A-D be oriented to detect strain that is substantially parallel to a longitudinal axis of the flow tube to which that strain gage is coupled.

For coil/magnet velocity pickoffs 170L, 170R, the maximal velocity amplitude is proximate the driver 180, which is typically located in the center of the "U" of a flow tube 130, 130'. However, coil/magnet velocity pickoffs 170L, 170R are not placed in this location as this would place the pickoffs 170L, 170R too close to the driver 180, so they are rather located at an area that provides suboptimal, yet resolvable, velocity amplitude to detect a phase signal differential. Maximum strain amplitude, however, is proximate the flow tube's 130, 130' respective brace bar 140, 140', and this is where the strain gages 200A, 200B are preferably located in the embodiments disclosed herein. In the above embodiment, two strain gages are utilized, but additional strain gages are also contemplated.

Figure 3:
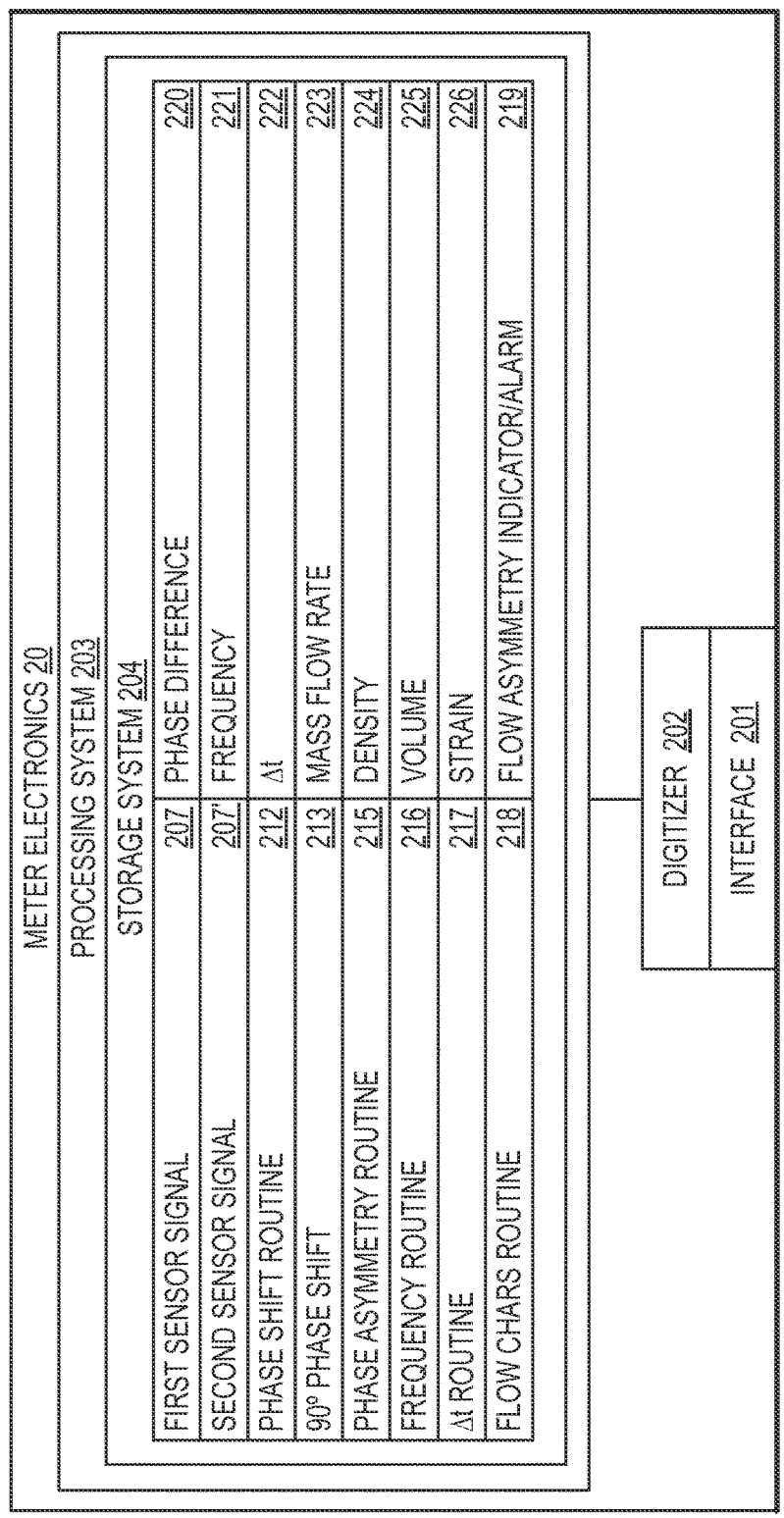
FIG. 3 is a diagram of meter electronics.

FIG. 3 illustrates meter electronics 20 of the flowmeter 5 according to an embodiment of the invention. The meter electronics 20 can include an interface 201 and a processing system 203. The meter electronics 20 receives first and second sensor signals from the meter assembly 10, such as strain gage 200A, 200B signals, for example. The meter electronics 20 processes the first and second sensor signals in order to obtain flow characteristics of the flow material flowing through the meter assembly 10. For example, the meter electronics 20 can determine one or more of a phase, a frequency, a time difference (Δt), a density, a mass flow rate, a strain, and a volume flow rate from the sensor signals, for example. In addition, other flow characteristics can be determined according to the invention.

The interface 201 receives the sensor signals from the strain gages 200A-D via the leads 100 illustrated in FIG. 2. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices, such as through the communication path 26, for example. The interface 201 can be capable of any manner of electronic, optical, or wireless communication.

The interface 201 in one embodiment includes a digitizer (not shown), wherein the sensor signal comprises an analog sensor signal. The digitizer samples and digitizes the analog sensor signal and produces a digital sensor signal. The interface/digitizer can also perform any needed decimation, wherein the digital sensor signal is decimated in order to reduce the amount of signal processing needed and to reduce the processing time.

The processing system 203 conducts operations of the meter electronics 20 and processes flow measurements from the sensor assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

In the embodiment shown, the processing system 203 determines the flow characteristics from two or more vibrational/strain responses 220, 226. The processing system 203 can determine at least a magnitude, phase difference, time difference, and a frequency of the two or more responses 220, 226. In an embodiment, a signal from at least one bridge circuit 206, 206', in electrical communication with the strain gages 200A-D, is input into the meter electronics 20.

The storage system 204 can store flowmeter parameters and data, software routines, constant values, and variable values. In one embodiment, the storage system 204 includes routines that are executed by the processing system 203. In one embodiment, the storage system 204 stores a phase shift routine 212, a phase asymmetry routine 215, a frequency routine 216, a time difference (Δt) routine 217, a flow characteristics routine 218, and a flow asymmetry indicator/alarm routine 219.

In one embodiment, the storage system 204 stores variables used to operate the flowmeter 5. The storage system 204 in one embodiment stores variables such as the two or more vibrational responses 220, 226 which are received from the strain gages 200A-D. In some embodiments, the storage system 204 stores one or more values generated by the meter electronics 20. In some embodiments, the storage system 204 stores one or more flow characteristics obtained from the flow measurements. The storage system 204 also stores variables related to flow asymmetry alarm threshold values.

Embodiments sense flow asymmetry by directly measuring the relative motion of the inlet legs 131, 131' of the flowtube 130, 130' or the outlet legs 134, 134' of the flowtube 130, 130'. Strain gages 200A-D connected to at least one bridge circuit 206, 206' are configured to produce a zero-amplitude signal during all symmetric flow conditions, be it a no flow condition (which corresponds to a normal mode shape of the drive mode, i.e. no phase difference between the flow tubes) or during any symmetric flow condition. However, during asymmetric flow, the same configuration will produce a sinusoid signal output at the driving frequency whose amplitude and sign is an indication of the level of uneven flow between flow tubes 130, 130'.

Figure 4:
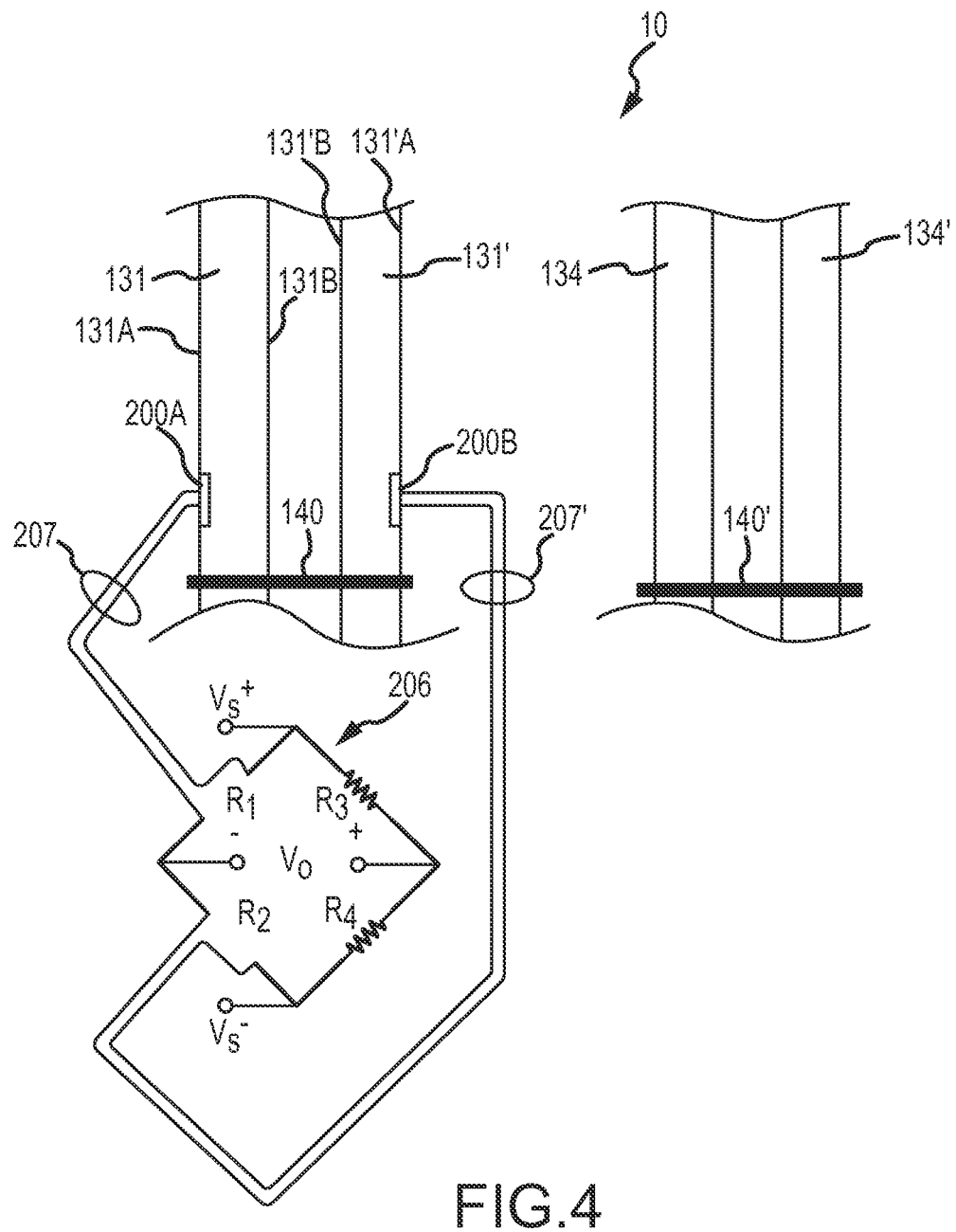
FIG. 4 illustrates an embodiment of a flowmeter wherein strain gages are connected to a bridge circuit.
Figure 5:
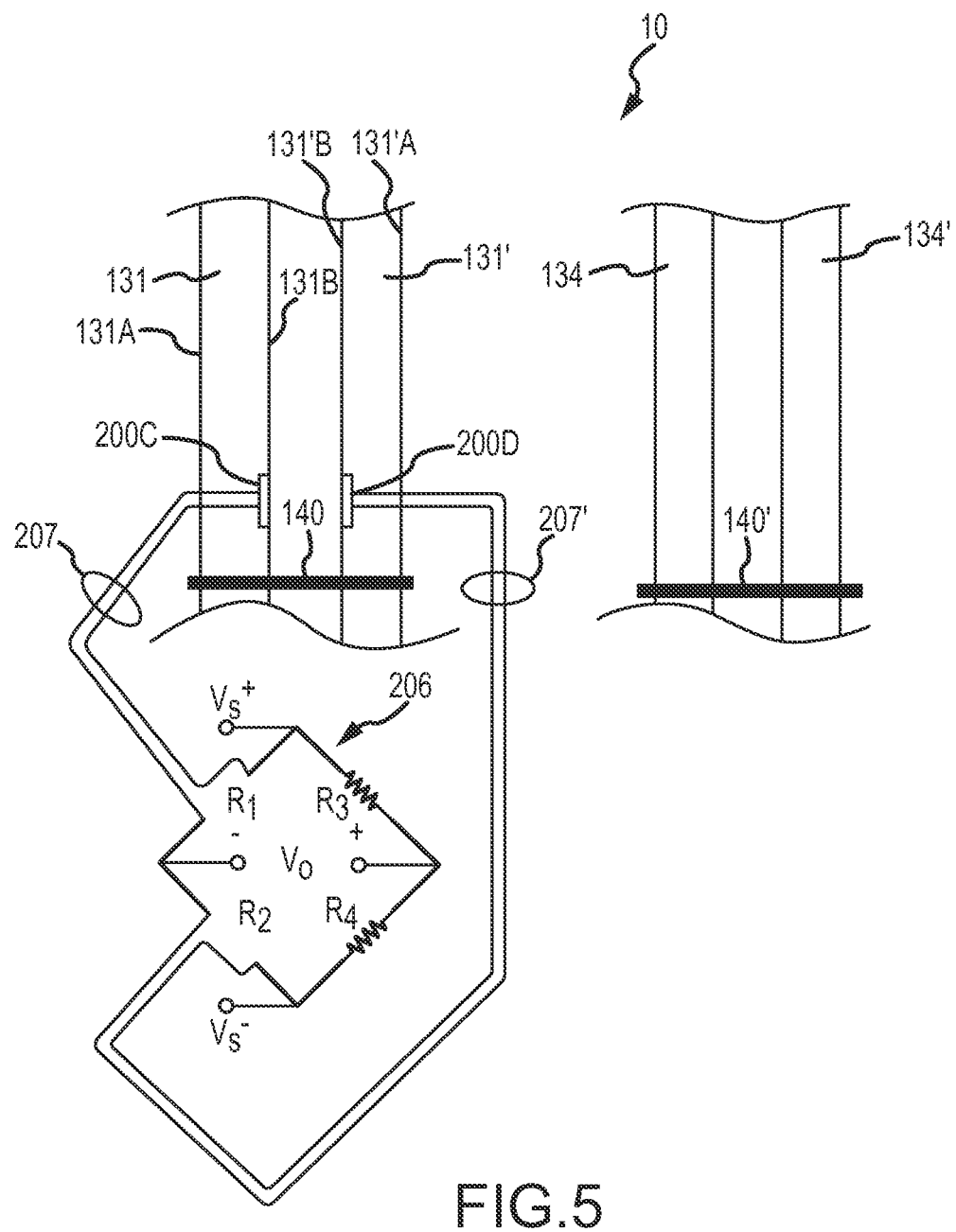
FIG. 5. illustrates an another embodiment of a flowmeter wherein strain gages are connected to a bridge circuit.

Referring to FIGS. 4-5 strain gages 200A-D are preferably located on inlet 131, 131' or outlet 134, 134' sides of a flow tube 130, 130' at a region proximate a brace bar 140, 140', as the greatest positive strain (tension) and highest negative strain (compression) occur at the junction between the flow tubes 130, 130' and respective brace bars 140, 140'. A preferred distance for a strain gage to be coupled to a flow tube is between approximately 0% and 15% of the straight-line distance between a brace bar 140, 140' and the top of a flow tube 130, 130' (measured along a vector perpendicular to the flowing tube direction at its uppermost portion). An even more preferred distance is between about 6% and 9%. However, these distances serve as examples, with other distances also contemplated to be within the scope of the description and claims. The strain gages 200A-D are preferably placed to sense vertical strain (i.e. strain parallel with the longitudinal axis of a flow tube 130, 130') on the flow tubes 130, 130'.

FIG. 4 illustrates an embodiment of a flowmeter 5 having two strain gages 200A, 200B in electrical communication with a bridge circuit 206. The bridge circuit 206 converts small changes in resistance of the strain gage into relatively large changes in voltage. The bridge circuit 206 is comprised of a supply voltage, $V_s$, four resistors ($R_1$ through $R_4$), and an output voltage, $V_o$. The bridge is considered balanced, and the output voltage is 0 v when $R_1=R_2$ and $R_3=R_4$. A change in any of the resistors will unbalance the bridge and the output voltage will no longer be zero. The relationship between the supply voltage, resistances, and output voltage is shown in equation 1.

$$V_o = \left( \frac{R_3}{R_3 + R_4} - \frac{R_2}{R_1 + R_2} \right) * V_s \tag{1}$$

The resistor numbers correspond to the resistor locations shown in FIG. 4. Any or all of the resistors in the bridge circuit 206 can be replaced by a strain gage. In this embodiment, two strain gages 200A, 200B are present on the inlet sides 131, 131' of the flow tubes 130, 130', and connected to a bridge circuit 206. The first gage 200A is connected to the first position $R_1$ in the bridge circuit 206, and the second gage 200B is connected to the second position $R_2$ of the bridge circuit 206. It should be noted that remaining resistors $R_3$ and $R_4$ are fixed value resistors, each having the same value. Additionally, for this embodiment, it is important that the strain gages 200A, 200B be located on the same relative surface of the flow tubes 130, 130', which in this embodiment means that the first strain gage 200A is oriented on the distal surface 131A of the first inlet leg 131 of the first flow tube 130, while the second strain gage 200B is oriented on the distal surface 131'A of the second inlet leg 131' of the second flow tube 130'. It will be apparent to one skilled in the art that if the gages 200A, 200B have their positions swapped so that the first gage 200A is positioned at the second position $R_2$ of the bridge circuit 206 and the second gage 200B is positioned at the first position $R_1$ of the bridge circuit 206, that asymmetry detection would remain intact. Similarly, if fixed resistors were used in positions $R_1$ and $R_2$, while the gages 200A, 200B have their positions swapped to the $R_3$ and $R_4$ side of the bridge circuit 206, the asymmetry detection functionality would also remain intact. Additionally, similar embodiments are also contemplated wherein the strain gages 200A, 200B are located on the outlet legs 134, 134' of the flow tubes 130, 130'.

FIG. 5 also illustrates an embodiment of a flowmeter 5 having two strain gages 200C, 200D in electrical communication with a bridge circuit 206. In this embodiment, the two strain gages 200C, 200D are present on the inlet sides 131, 131' of the flow tubes 130, 130', and connected to a bridge circuit 206. The first gage 200C is connected to the first position $R_1$ in the bridge circuit 206, and the second gage 200D is connected to the second position $R_2$ of the bridge circuit 206. It should be noted that remaining resistors $R_3$ and $R_4$ are fixed value resistors, each having the same value. Additionally, for this embodiment, it is important that the strain gages 200C, 200D be located on the same relative surface of the flow tubes 130, 130', which in this embodiment means that the first strain gage 200C is oriented on the proximal surface 131B of the first inlet leg 131 of the first flow tube 130, while the second strain gage 200D is oriented on the proximal surface 131'B of the second inlet leg 131' of the second flow tube 130'. It will be apparent to one skilled in the art that if the gages 200C, 200D have their positions swapped so that the first gage 200C is positioned at the second position $R_2$ of the bridge circuit 206 and the second gage 200D is positioned at the first position $R_1$ of the bridge circuit 206, that asymmetry detection would remain intact. Similarly, if fixed resistors were used in positions $R_1$ and $R_2$, while the gages 200C, 200D have their positions swapped to the $R_3$ and $R_4$ side of the bridge circuit 206, the asymmetry detection functionality would also remain intact. Additionally, similar embodiments are also contemplated wherein the strain gages 200C, 200D are located on the outlet legs 134, 134' of the flow tubes 130, 130'.

Additional gages can be added, such that there are four gages that measure the strain of both inlet legs 131, 131' and outlet legs 134, 134' simultaneously, which increases the signal output of the bridge circuit 206. In these embodiments, a single bridge circuit 206 is connected to all four strain gages 200A-D, or alternatively, the inlet legs 131, 131' are connected to a first bridge circuit 206, and the outlet legs 134, 134' are connected to a second bridge circuit 206'.

The effects of adding additional gages are best understood by manipulating equation 1 using the relationship of equation 2:

$$\frac{\Delta R}{R} = GF * \varepsilon \quad (2)$$

where $\Delta R$ is the change in the resistance of the strain gage, R is the unstrained resistance of the strain gage, GF is the gage factor of the gage, and $\varepsilon$ is strain on the gage. The gage factor, GF, of a strain gage relates the strain on the gage to the gage's corresponding change in resistance. The strain gage is assigned a specific gage factor when calibrated during production. Using the above relationship, and assuming that $\Delta R$ is much smaller than R, equation 2 can be re-written as equation 3:

$$V_o = \frac{GF}{4}(\varepsilon_1 - \varepsilon_2 + \varepsilon_3 - \varepsilon_4) * V_s \quad (3)$$

For the embodiments illustrated by FIGS. 4 and 5, when there is no flow through the flowmeter 5 and the flowmeter 5 is vibrating in the drive mode, the sinusoidal strain sensed by both strain gages 200A, 200B is theoretically in-phase and will cancel out, resulting in a zero voltage output from the bridge circuit. In practice, there may be some phase at no flow (commonly referred to as mechanical zero) resulting in a low amplitude sinusoid whose amplitude would be measured and removed as an offset.

Once there is flow in the flowmeter 5, based on the position of the gages in the bridge circuit 206 and the orientation of the strain gages 200A-D on the inlet legs 131, 131' or outlet legs 134, 134' (depending on the embodiment), the flow tubes 130, 130' will vibrate in-phase, resulting in zero delay (zero phase shift) between the two strain measurements, in the case where no obstructions in either flow tube are present. In particular, the strain values would cancel per equation 2, and the output voltage of the bridge circuit 206 would be zero. Should flow become asymmetric (due to blocking, e.g., or other phenomena), the phase along each flow tube 130, 130' will become different because there is a different mass flow in each flow tube 130, 130' (though the relative phase between both flow tubes 130, 130' remains the same and does not affect the flow measurement using traditional pickoff means). A time delay (phase shift) develops between the two strain measurements, and the electrical subtraction of the two phase-shifted signals in equation 4 below will result in a sinusoidal output (at the drive frequency) whose amplitude is directly related to the phase shift. As flow becomes more asymmetric, the phase shift increases and the amplitude of the voltage out of the bridge circuit 206 increases. Equation 4 describes the configuration of strain gages 200A, 200B in FIG. 4 and strain gages 200C, 200D of FIG. 5. With regard to the bridge circuit 206:

$$V_{out} = \frac{V_s}{4} GF * (\Delta_{\varepsilon_1} - \Delta_{\varepsilon_2}) \quad (4)$$

As described above, this equation indicates that there is a zero output under no-flow conditions or symmetric flow, but the subtraction between $R_1$ and $R_2$ yields a detectable $V_{out}$ when a flow asymmetry exists.

When the flow tubes 130, 130' are being driven, the strain signals from the strain gages 200A, 200B can be thought of as sinusoids, each having their own amplitude ($\alpha_i$) and a relative phase between them ($\phi$). When these two signals are subtracted, the resulting signal will have amplitude as shown below in Equation 5:

$$\alpha_1 \sin(\omega t) \pm \alpha_2 \sin(\omega t + \phi) = A \sin(\omega t + \phi) \quad (5)$$

$$A = \sqrt{\alpha_1^2 + \alpha_2^2 \pm 2\alpha_1 \alpha_2 \cos(\phi)}$$

This subtraction is performed electrically by the bridge circuit 206. When flow is symmetric, $\phi$ is zero and the individual amplitudes are substantially the same, resulting in a signal with no amplitude, A=0. Practically, the individual $\alpha_i$ may be slightly different, resulting in a bias during symmetric flow, which is characterized and accounted for. When flow becomes asymmetric, $\phi$ becomes nonzero since there is a mass flow imbalance between the first and second flow tubes 130, 130', so the output signal amplitude, A, changes. This change is detected and used to inform the user that flow asymmetries exist.

In an embodiment, phase shifts are calibrated to detect flow asymmetry and flow rate in each tube by incorporating two more gages at the inlet 131, 131' and outlet 134, 134' and employing flow measurement as is described in International Patent Application No. PCT/US2014/033188.

In an embodiment, a diagnostic indicator notifies a user of the flowmeter 5 that flow is not splitting symmetrically. Notification comprises an audible and/or visual alarm. In a related embodiment, an amplitude threshold is determined. When the amplitude of the flow becomes asymmetric and $\phi$ becomes nonzero due to the mass imbalance between the first and second flow tubes 130, 130', the output signal amplitude of the bridge circuit 206 increases, and when the amplitude exceeds the predetermined threshold, the alarm is triggered. The alarm may simply comprise the notification of a flowmeter 5 user. The threshold may be preset in meter electronics 20 at the factory, or may be set by the user.

Turning again to FIG. 2, an embodiment comprises electronic components 400 in addition to the bridge circuit 206. Though illustrated with two gages 200A, 200B and a single bridge circuit 206 as an example, the electronic components 400 can be adapted for use with any number of strain gage and bridge circuit combinations, as will be apparent to one skilled in the art.

Output from the bridge circuit 206 is connected to the electronic components 400, which may include a bridge completion amplifier. In one embodiment, the bridge completion amplifier has a gain of approximately 800, but different gains are contemplated based on particular strain gages, differing flow control factors, different electronics, and other variables particular to a specific flowmeter 5. The bridge completion amplifier is AC coupled with a high-pass filter. In an embodiment, the high-pass-filter comprises a capacitor. This capacitive coupling substantially blocks the DC component of the signal. In a related embodiment, the output from the high-pass filter is anti-aliased with a low-pass filter to prevent signals with frequencies greater than a particular analog to digital converter's sampling rate from being seen by that analog to digital converter (ADC). An ADC may receive the signal from the low-pass filter, which is then sent to meter electronics 20.

For embodiments herein, the voltage output of a bridge circuit 206, 206' is input into the meter electronics 20. Because of DC drift that is inherent with strain gage measurement, the use of digital electronics is helpful in making accurate phase measurements between signals. With analog electronics, the phase between two sinusoidal signals, such as from the strain gages 200A-D, is typically calculated once a cycle when the signals from the gages 200A-D cross through zero volts. Because there is some DC drift with strain gages, the signals are not always centered at zero volts, making a steady phase calculation difficult. An embodiment utilizes a Hilbert filter to continuously calculate phase between the two pickoff signals. With this approach, DC offset in the signal does not affect phase calculation.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and method, and not just to the embodiments described above and shown in the accompanying figures. Accordingly, the scope of the invention should be determined from the following claims.

What is claimed is:

1. A flowmeter (5) including a sensor assembly (10) and a meter electronics (20), comprising:
    two or more flow tubes (130, 130');
    a driver (180) coupled to the two flow tubes (130, 130') and configured to induce a drive mode vibration in the two flow tubes (130, 130');
    two or more strain gages (200A-D) coupled to the two flow tubes (130, 130') and configured to detect a phase of the drive mode vibration;
    one or more bridge circuits (206, 206') in electrical communication with the two or more strain gages (200A-D), configured to output a signal indicating an asymmetric flow between the two or more flow tubes (130, 130').

2. The flowmeter (5) of claim 1, wherein the signal is proportional to a strain difference between the two or more strain gages (200A-D).

3. The flowmeter (5) of claim 1, wherein the signal comprises an electrical subtraction of a signal from a first of the two or more strain gages (200A-D) from a signal from a second of the two or more strain gages (200A-D).

4. The flowmeter (5) of claim 3, wherein the signal further comprises a sinusoidal output at a drive mode frequency having an amplitude that is proportional to a difference that comprises the subtraction of a phase-shifted signal of the first of the two or more strain gages (200A-D) from a phase-shifted signal of the second of the two or more strain gages (200A-D).

5. The flowmeter (5) of claim 1, further comprising a magnet/coil pickoff sensor coupled to the two or more flow tubes (130, 130').

6. The flowmeter (5) of claim 1, further comprising an indicator configured to indicate an asymmetric flow between the two or more flow tubes (130, 130').

7. The flowmeter (5) of claim 6, wherein the indicator comprises at least one of a visual and an audible alarm.

8. The flowmeter (5) of claim 1, wherein a strain gage of the two or more strain gages (200A-D) is coupled to one of the two or more flow tubes (130, 130') and is configured to detect a strain of the one of the two or more flow tubes (130, 130') that is approximately parallel with the longitudinal axis of the one of the two or more flow tubes (130, 130').

9. The flowmeter (5) of claim 1, wherein a strain gage of the two or more strain gages (200A-D) is placed proximate a brace bar (140, 140') so that the strain gage of the two or more strain gages (200A-D) is subjected to approximately a maximum strain amplitude of the two or more flow tubes (130, 130') induced by the drive mode vibration.

10. The flowmeter (5) of claim 1, wherein:
    a first strain gage of the two or more strain gages (200A-D) is coupled to a distal surface (131A) of an inlet leg (131) of a first flow tube of the two or more flow tubes (130, 130');
    the first strain gage of the two or more strain gages (200A-D) is in electrical communication with a first position (R1) of a first bridge circuit (206) of the one or more bridge circuits (206, 206');
    a second strain gage of the two or more strain gages (200A-D) is coupled to a distal surface (131'A) of an inlet leg (131) of the first flow tube of the two or more flow tubes (130, 130'); and
    the second strain gage of the two or more strain gages (200A-D) is in electrical communication with a second position (R2) of the first bridge circuit (206) of the one or more bridge circuits (206, 206').

11. The flowmeter (5) of claim 1, wherein:
    a first strain gage of the two or more strain gages (200A-D) is coupled to a proximal surface (131B) of an inlet leg (131) of a first flow tube of the two or more flow tubes (130, 130');
    the first strain gage of the two or more strain gages (200A-D) is in electrical communication with a first position (R1) of a first bridge circuit (206) of the one or more bridge circuits (206, 206');
    a second strain gage of the two or more strain gages (200A-D) is coupled to a proximal surface (131'B) of an inlet leg (131) of the first flow tube of the two or more flow tubes (130, 130'); and
    the second strain gage of the two or more strain gages (200A-D) is in electrical communication with a second position (R2) of the first bridge circuit (206) of the one or more bridge circuits (206, 206').

12. A flowmeter (5) including a sensor assembly (10) and a meter electronics (20), comprising:
two or more flow tubes (130, 130');
a strain gage and a bridge circuit (200) coupled to at least one of the two or more flow tubes (130, 130'), wherein the strain gage is in communication with the bridge circuit (200) configured to output a signal to indicate the presence of an asymmetric flow between the two flow tubes (130, 130').

13. The flowmeter (5) of claim 12, further comprising an electrical circuit in communication with the sensor (200).

14. The flowmeter (5) of claim 12, wherein the signal comprises an imbalance in the bridge circuit (206, 206').

15. The flowmeter (5) of claim 14, wherein the signal further comprises a sinusoidal output at a drive mode frequency having an amplitude that is proportional to a difference that comprises an electrical subtraction comprising a phase-shifted signal of the sensor (200).

16. The flowmeter (5) of claim 12, wherein the signal comprises a changed amplitude of an output of the bridge circuit (206, 206').

17. The flowmeter (5) of claim 12, wherein the signal comprises an electrical subtraction comprising a phase-shifted signal of the sensor (200).

18. A method for determining flow asymmetry through two flow tubes in a flowmeter, comprising the steps of:
vibrating the two flow tubes in a drive mode vibration;
measuring a vibrational response of a first flow tube of the with a first strain gage;
measuring a vibrational response of a second flow tube of the with a second strain gage;
comparing the vibrational responses of the first and second flow tubes; and
determining the presence of a flow asymmetry between the first and second flow tubes.

19. The method for determining flow asymmetry through two flow tubes in a flowmeter of claim 18, further comprising the step of:
indicating a presence of a flow asymmetry if the difference in the vibrational responses between the first flow tube and the second flow tube is greater than a predetermined threshold.

20. The method for determining flow asymmetry through two flow tubes in a flowmeter of claim 18, wherein the step of indicating the presence of the flow asymmetry if the difference in the vibrational responses between the first flow tube and the second flow tube is greater than a predetermined threshold comprises the step of triggering an alarm.

21. The method for determining flow through two flow tubes in the flowmeter of claim 20, further comprising the steps of:
coupling the first strain gage to a distal surface of a leg of the first flow tube, wherein the first strain gage is in electrical communication with a first position of a bridge circuit;
coupling the second strain gage to a distal surface of a leg of the second flow tube, wherein the second strain gage is in electrical communication with a second position of the bridge circuit.

22. The method for determining flow through two flow tubes in the flowmeter of claim 21, wherein:
the first strain gage is coupled to the first flow tube proximate a brace bar; and
the second strain gage is coupled to the second flow tube proximate a brace bar.

23. The method for determining flow asymmetry through two flow tubes in a flowmeter of claim 18, wherein the step of comparing the vibrational responses of the first and second flow tubes further comprises the step of:
generating an output signal from at least one bridge circuit.

24. The method for determining flow asymmetry through two flow tubes in a flowmeter of claim 18, wherein:
the vibrational response of the first flow tube comprises a strain of the first flow tube; and
the vibrational response of the second flow tube comprises a strain of the second flow tube.

25. A method for determining flow asymmetry through two flow tubes in a flowmeter, comprising the steps of:
vibrating the two flow tubes;
determining an absolute phase of a first flow tube of the two flow tubes;
determining an absolute phase of a second flow tube of the two flow tubes; and
determining a difference in absolute phase between the first flow tube and the second flow tube.

26. The method for determining flow asymmetry through two flow tubes in a flowmeter of claim 25, further comprising the steps of:
measuring a first strain of the first flow tube; and
measuring a second strain of the second flow tube.

27. The method for determining flow asymmetry through two flow tubes in a flowmeter of claim 25, further comprising the step of:
indicating a presence of a flow asymmetry if the difference in absolute phase between the first flow tube and the second flow tube is greater than a predetermined threshold.

* * * * *